May 21, 1929.   H. VOGT ET AL   1,713,726
DEVICE FOR PHONOGRAPHS WITH LINEAR PHONOGRAM CARRIERS
Filed March 20, 1922   3 Sheets-Sheet 1

Inventors
H. Vogt
J. Massolle and
J. Engl.
by
Attorneys.

May 21, 1929.  H. VOGT ET AL  1,713,726
DEVICE FOR PHONOGRAPHS WITH LINEAR PHONOGRAM CARRIERS
Filed March 20. 1922  3 Sheets-Sheet 2

Inventors.
H. Vogt
J. Massolle and
J. Engl.
by
Attorneys.

May 21, 1929. H. VOGT ET AL 1,713,726
DEVICE FOR PHONOGRAPHS WITH LINEAR PHONOGRAM CARRIERS
Filed March 20, 1922 3 Sheets-Sheet 3

Patented May 21, 1929.

1,713,726

REISSUED

UNITED STATES PATENT OFFICE.

HANS VOGT, OF BERLIN-WILMERSDORF, AND JOSEPH MASSOLLE AND JOSEF ENGL, OF BERLIN-GRUNEWALD, GERMANY, ASSIGNORS, BY MESNE ASSIGNMENTS, TO WILLIAM FOX, OF WOODSBURGH, NEW YORK.

DEVICE FOR PHONOGRAPHS WITH LINEAR PHONOGRAM CARRIERS.

Application filed March 20, 1922, Serial No. 545,377, and in Germany March 24, 1921.

The recording and the reproduction of sound waves by the use of linear phonogram carriers such as film strips, steel wires, and so forth, can only be effected in absolutely satisfactory manner, even after the removal of all other occurring difficulties, when the speed of the record carrier is uniform both for the receiving and the reproduction, and when in both cases no variations of any kind occur. Especially in the case of musical reproductions is the record extremely sensitive to the slightest variations of speed. Consequently, it has hitherto been usual to provide apparatuses such as phonographs and gramophones with speed regulators. In these apparatuses, however, the problem of the uniform motion does not assume the same importance as in the case of sound recording or reproducing apparatus embodying linear phonogram carriers, such as photographic sound records on film strips or ribbons because with the former the record carrier consists of a cylinder or disc possessing a somewhat considerable momentum when the desired velocity is imparted thereto which equalizes any small irregularities in the motion, such as may be caused, for instance, by the driving mechanism. In the latter case, however, that of phonographs with linear records, such as film strips, the portion of the record which is active at a given moment possesses practically no momentum to be taken into consideration. Irregularities in the motion, such, for instance, as may be caused by the projections, the teeth, the belts, the connecting places, and so forth, or by the friction, at the guiding point (the slot, the magnet, the condenser), become consequently very much more important with these and thus greatly impair the periodicity of the sound recorded.

According to the present invention, this draw-back which attaches to all hitherto known propulsion mechanisms for linear phonogram records is obviated by the arrangement, that the light sound record has given to it at the controlling point the property of a weighty mass. This is attained by the arrangement that the record carrier (a film strip or the like) is firmly pressed against one or more rollers connecting with a heavy rotating mass, so that the record moves in exact conformity with the rollers and the rotating mass.

Also, according to the present invention a dependable and highly efficient optical system is provided for use in conjunction with moving film strips of the above indicated character.

Various further and also various more specific objects, features and advantages will more clearly appear from the detailed description given below taken in connection with the accompanying drawings, which form a part of this specification.

The invention consists in such novel features, arrangements and combinations of parts and methods as may be shown, described and claimed in connection with the embodiments of the invention herein disclosed by way of example only.

Constructional examples of the invention are illustrated in the figures, in which:—

Figure 1:
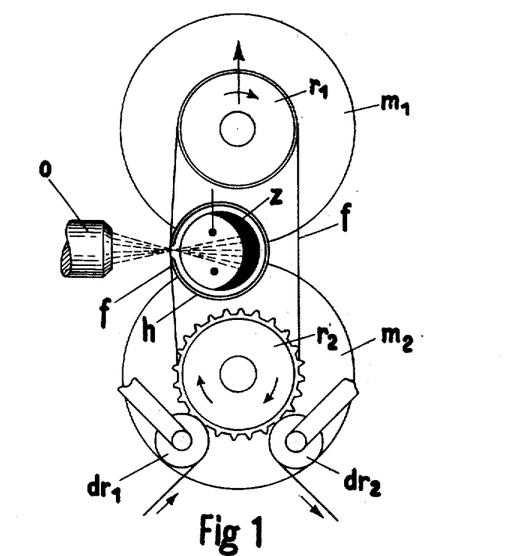
Figure 1 is a side elevation of a linear phonogram carrier.

Referring to Fig. 1, partially illustrating sound reproducing apparatus, the phonogram carrier, which in these illustrations is shown as a film strip bearing a photographic sound record, moves over the rollers $r'$, $r^2$, suitably coupled by gearing or belting, of which rollers preferably the roller $r^2$ directly driven by the motor is provided with teeth. One or even both rollers are rigidly connected with rotating masses as at $m'$, $m^2$, which give to the film strip $f$ travelling between them under tension the requisite uniformity of its motion. Between the rollers $r'$, $r^2$, there is placed preferably in a casing $A$ the light-sensitive cell $s$ sensitive to electric light, which is influenced by a light ray passing from a light source (not shown), through objective o, and then through the film. The rollers or idlers $dr'$, $dr^2$, press the film against the carrier roller $r^2$.

Figure 2:
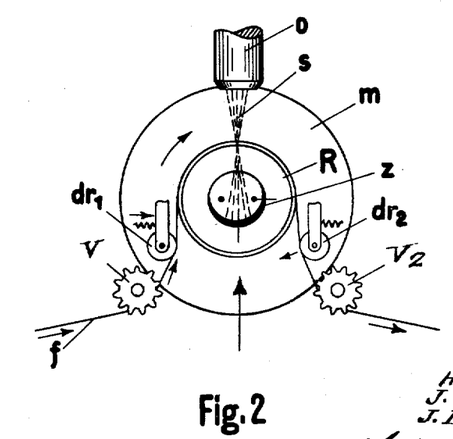
Figure 2 is a side elevation of a modified form of phonogram carrier.

Another construction of the invention as shown in Fig. 2, in which the little irregularities of movement often caused by the feeding of the film by the teeth or roller $r^2$, in the Fig. 1 construction, or which are caused by the mechanical vibrations of the stretches of film between rollers $r'$ and $r^2$, in the Fig. 1 construction, are avoided.

The film $f$ is drawn by the sprocket V to the controlling point $s$ and is removed from the controlling point by the roller $V^2$. Between these feeding sprockets, the film is guided over the periphery of a larger roller R on which it rests closely by friction, even during the turning motion. As the roller is rigidly connected with the rotating mass $m$, or can be constructed so as to be itself the rotating mass, the film moves uniformly on in like manner as the surface of the roller R. For the purpose of pressing the film upon the roller R, and for the equalizing of irregularities of motion, there are provided with spring-supported rollers $dr'$, $dr^2$. That is, the spring pressed rollers engaging the film at points between the feeding rollers and the fly wheel roller, thus exert resilient pressure against the film to force the film into effective engagement with the fly wheel and thereby at the same time the film is deflected from a straight line position, the extent of such deflection varying slightly with any irregularities in the movement of the film and its resulting tension, with the result that any such irregularities are effectively prevented from being imparted to the film at the point of translation. The light rays required for the illumination or the transmission of light through the film are thrown upon the film in the form of a narrow line by means of the objective $o$. When sound is to be reproduced from the photographic sound record on the film, the light rays pass through the film strip and fall upon the photo cell $z$ preferably placed in the interior of roller R. For this purpose, the roller is either partially transparent, made of glass, for example, or the part of the film bearing the sound record projects beyond the non-transparent parts of the roller.

In the hereinbefore described form of execution of the invention the driving of the film sound record is however not effected directly at the point of projection but in front or behind the same. The driving point of the film can however, in a further development of the invention, be arranged directly at the point at which light is projected through the record. The driving member can, in this case, be constructed in such a manner that the engaging and disengaging, of the feeding teeth of the film-feeding sprocket with the perforations of the film, will not affect the speed of the film at the projection point, i. e., at the point at which light falls upon the film in recording, or at which it passes through the film in reproducing.

Figure 3:
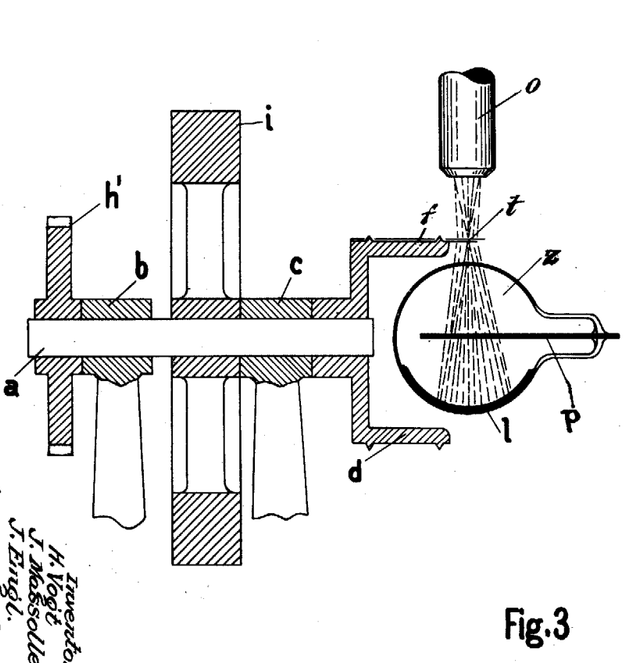
Figure 3 is a longitudinal section of another form of phonogram carrier.
Figure 4:
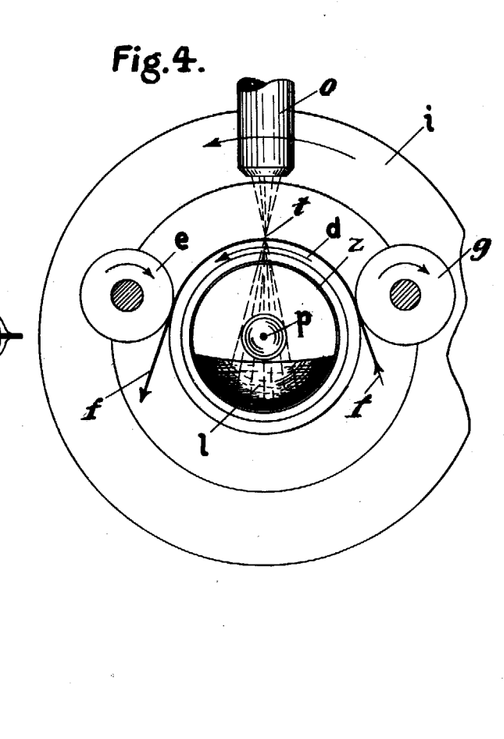
Figure 4 is an end view of the form of carrier shown in Figure 3.

Figures 3 and 4 show this form of construction by way of example. The shaft $a$ journalled at $b$ and $c$, carries at one end the feeding-cylinder $d$ which has the customary teeth designed to engage with the perforations of the film. The film $f$ is in contact with one part of the circumference of this cylinder, the length of this part corresponding with the distance between the pressure rollers $e$ and $g$, Fig. 4. The driving member $h'$ such as a gear for example, and also the fly wheel $i$, are keyed upon this shaft and designed to communicate to the shaft and consequently to the cylinder $d$, a uniform revolving speed. The film will consequently move also with uniform speed, for instance in the direction $g—e$. These rollers $e—g$ press the film strip firmly against the cylinder $d$ so that it lies, without possibility of being shifted, upon the entire peripheral length of cylinder $d$ from $g$ to $e$, because of the feed teeth of cylinder $d$ engaging with the perforations of the film. The engagement and disengagement of the feed teeth on cylinder $d$, with the perforations of the film, takes place under the pressure of the rollers $g$ and $e$, Fig. 4, so that vibrations or jerky motions of the film band, due to such tooth engagement or disengagement, no longer make themselves felt at the point of light projection through the same. The free ends $f—f$ of the film band are preferably guided by rollers (not shown) for preliminary winding up in the manner well known in picture cinematography, so that they form a loop.

It will be understood that the invention is intended particularly for use in connection with transparent film records, on which sound is recorded photographically, by causing acoustically modulated light to act upon the film at the control point. Also that, in reproducing, light passes through the sound record on the film at the control point, and falls upon the photo-cell $z$ to set up currents corresponding, in frequency variations, to the sound record through which the light has passed. Also, that the film may pass from a supply reel on which it is wound, at the starting end, to a reel on which it is progressively wound, at the final end, as is usual in cinematography. Further, that the film contemplated may be a talking moving picture film, containing pictures in addition to the sound record. Such a record must be fed intermittently past the point at which the pictures are recorded on the film, or at which the projection light shines through the pictures in reproducing. In addition there is need of feeding the film uniformly past the point at which the sound is recorded or reproduced. For such film the loop referred to is preferably formed, between the point of intermittent feed for picture recording or projection, and the point of uniform motion for sound recording or reproducing, the production of such loops in the film being common in cinematography.

For recording purposes a solid cylinder or roller may be employed in place of the roller $d$ upon which the full width of the film strip will bear, since in recording the acoustically modulated light which is to be recorded need not pass through the film but only need act upon the sensitized upper surface thereof.

For reproducing purposes, a specially constructed roller $d$ is required. This is for the reason that the light from the projection light source, condensed by the lens $o$ to a narrow line at the surface of the film, must pass through the film and fall upon a light-sensitive element, for instance the cell $z$ with the cathode $l$ and anode $p$. The cylinder or roller $d$ in Figure 3 shows a form of construction by way of example in which the part of the film which carries the sound record projects beyond the edge of the cylinder. The light collected by the object glass $o$ to a narrow line, comes from a suitable known means or source of light projection so arranged, as indicated for example by the dotted lines in Figs. 3 and 4, that the converged narrow line of light is substantially focused or impinges upon the area of translation $t$ on the film as a line running transversely of the direction of movement of the film.

Certain features of this type of optical system are also disclosed in our Patent No. 1,590,185, issued June 29, 1926, application for which was filed on April 4, 1921, and the claims of which patent relate to divisional subject matter.

The sound record as indicated in Fig. 3 may be located at the outer side of one row of perforations in the film. The sound record markings can, however, if desired, be located between the two rows of perforations in the film, in which case only one row of perforations would be utilized for feeding the film, these perforations being engaged by the teeth on roller $d$ nearest to the center of cell $z$. In this case the sound record portions of the film would still overhang the edge of roller $d$, the far overhanging edge of the film, moving along either without a special guidance or running over a roller with or without feeding teeth, which roller may be an idler or may be specially driven, as desired.

Another feature may advantageously be incorporated in the invention. If the driving shaft of the tone-film revolves with a low number of revolutions and if a rigid drive is used, the circumferential speed of fly wheels which can be practically utilized, will, under certain conditions, not be sufficient for compensating the speed fluctuations.

According to the invention the driving of the fly wheel axle is therefore effected with the aid of an elastic coupling, for instance a spring. This spring can be very feeble as, at constant speed, it has to overcome only the losses from friction of the driven part. As however, at the starting and stopping of the driving mechanism, the inertia of the fly wheel has to be overcome, it is advantageous to limit the play of the spring in either direction by a fixed stop.

Figure 5:
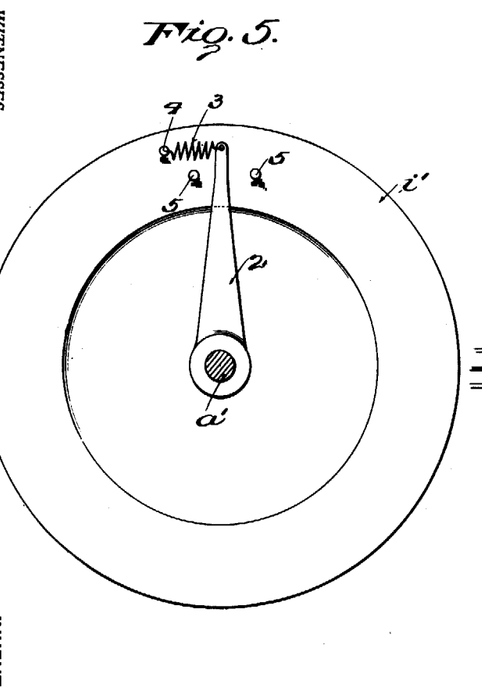
Figure 5 is a view in elevation of a fly wheel showing an elastic coupling adaptable to the rear side of the fly wheels, the face views of which are shown in various of the other figures.
Figure 6:
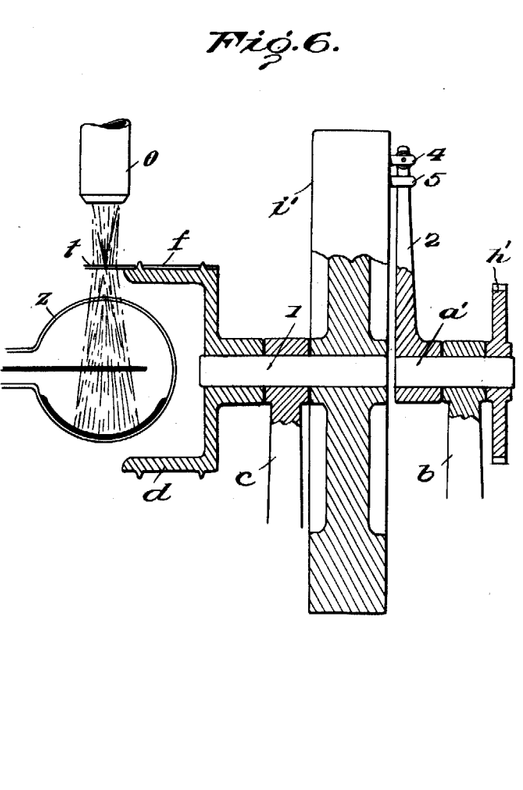
Figure 6 is a vertical section of the same.

Figures 5 and 6 show such a form of execution by way of example. The axle $l$ of the wheel with the rotating mass $i'$ is separate from the driving shaft $a'$. Upon the latter a lever 2 is arranged which drives the rotating mass through the intermediary of the spring 3 and of the stud 4 fixed to the fly wheel. The studs 5 which are also fixed on the fly wheel limit the stroke of the lever 2 at the starting and at the stopping so that the spring 3 is protected against excessive tension and against jumping out of position.

While the invention has been described in detail with respect to certain particular preferred examples which give satisfactory results, it will be understood by those skilled in the art after understanding the invention that various changes and modifications may be made without departing from the spirit and scope of the invention, and it is intended therefore in the appended claims to cover all such changes and modifications.

We claim:—

1. In phonographic apparatus in which the sound record is formed on an elongated carrier of inconsiderable mass, the combination of means for supporting and progressing the elongated carrier from one point to another point, and past an intermediate point at which the record is made on the carrier in recording or from which the record is taken from the carrier in reproducing, including a cylinder over a portion of the periphery of which the carrier passes adjacent to said intermediate point, a flywheel associated with said cylinder, and means for rotating said cylinder, under control of said fly-wheel, at uniform speed.

2. In phonographic apparatus in which the sound record is formed on an elongated carrier of inconsiderable mass, the combination of means for supporting and progressing the elongated carrier from one point to another point, and past an intermediate point at which the record is made on the carrier in recording or from which the record is taken from the carrier in reproducing, including a cylinder over a portion of the periphery of which the carrier passes adjacent to said intermediate point, a fly-wheel associated with and imparting uniform rotational movement to said cylinder, a driving member, and connections for driving said fly-wheel and cylinder from said driving member including a resilient device for absorbing irregularities of speed in said driving member.

3. In phonographic apparatus in which the sound record is formed on an elongated carrier of inconsiderable mass, the combination of a cylinder, a fly-wheel associated therewith, means for rotating said cylinder at uniform speed under control of said fly-wheel, means for feeding the carrier upon said cylinder at one point and off therefrom at another point and causing it to adhere closely thereto without slippage between said points, and means, between which and the record carrier acoustically modulated energy is transferred, as the carrier moves past the same, coacting with the carrier when at a position on said cylinder intermediate said two first named points.

4. In phonographic apparatus in which the sound record is photographically formed on a film ribbon of inconsiderable mass, the combination of a cylinder, a fly-wheel associated therewith, means for rotating said cylinder at uniform speed under control of said fly-wheel, means for feeding a record film ribbon upon said cylinder at one point and off therefrom at another point and causing it to adhere closely thereto without slippage between said points, and means for directing light upon the record film ribbon when at a position on said cylinder intermediate said two first named points.

5. In phonographic apparatus in which the sound record is formed on an elongated ribbon of inconsiderable mass, having feeding perforations therein, the combination of means for supporting and progressing the record ribbon from one point to another point and past an intermediate point at which the record is made on the ribbon in recording or from which the record is taken from the ribbon in reproducing, including a toothed cylinder over a portion of which the ribbon passes adjacent to said intermediate point, the teeth of said cylinder engaging the perforations of the ribbon, a fly-wheel associated with said cylinder, and means for rotating said cylinder, under control of said fly-wheel at uniform speed.

6. In phonographic apparatus in which the sound record is formed on an elongated ribbon of inconsiderable mass, having feeding perforations therein, the combination of means for supporting and progressing the record ribbon from one point to another point and past an intermediate point at which the record is made on the ribbon in recording or from which the record is taken from the ribbon in reproducing, including a cylinder for supporting the record at said intermediate point, a fly-wheel associated with said cylinder for causing uniform motion to be imparted to said cylinder, toothed means engaging the perforations of the ribbon for feeding the latter over the cylinder, and means contacting with the ribbon to prevent vibration thereof when said toothed means are engaging or disengaging the perforations of the ribbon.

7. In phonographic apparatus in which the sound record is formed on an elongated carrier of inconsiderable mass, the combination of means for supporting and progressing the elongated carrier from one point to another point, and past an intermediate point at which the record is made on the carrier in recording or from which the record is taken from the carrier in reproducing, including a cylinder over a portion of the periphery of which the carrier passes adjacent to said intermediate point, a fly-wheel, a shaft on which said cylinder and fly-wheel are both secured, a driving member coaxial with said shaft, a resilient connection between said driving member and fly-wheel, and stop means for limiting the amount of yielding of said resilient connection.

8. In phonographic apparatus in which the sound record is photographically formed on a film of ribbon of inconsiderable mass, the combination of a cylinder, a fly-wheel therewith, means for rotating said cylinder at uniform speed under control of said fly-wheel, means for feeding a record film onto said cylinder at one point and off therefrom at another point and causing the film to adhere closely to the cylinder without slippage between said points, said film record being arranged to overhang one end of the cylinder, a photo-cell positioned inwardly of the overhanging position of the film, and means for directing light through said overhanging portion onto said photo-cell.

9. The method of translating sound or similar vibrations to or from a film record by the use of light varied in accordance with the sound, which comprises flexing the film arcuately longitudinally at the point of translation and rapidly and uniformly moving the film in a circumferential direction past said point.

10. An apparatus for translating sound vibrations representative of speech, music or the like, to or from a film record by the use of light varied in accordance with the sound, which comprises means for imparting to the film a rapid and uniform motion longitudinally of the film and for retaining the moving film under tension at the area of translation, a source of light projection for providing a line of said light in fixed position, and an objective lens in the neighborhood of said area of translation on the film but spaced therefrom for collecting said projected light and directing the same as a converged narrow line impinging upon said area of translation transversely of the direction of movement of the film.

11. An apparatus for translating sound vibrations representative of speech, music or the like, to or from a film record by the use of a line of light varied in accordance with the sound, which comprises means for imparting to the film a rapid and uniform motion longitudinally of the film, a source of light projection for providing said light, and an objective lens in the neighborhood of the area of translation on the film but spaced therefrom for collecting said projected light and directing the same as a converging narrow line of light impinging directly on to the film at a point in the neighborhood of the focal point of said lens.

12. An apparatus for reproducing speech, music or the like sounds from vibrations recorded on a film, comprising a photoelectric cell, means for imparting to the film a rapid and uniform motion longitudinally of the film past said cell, a source of light projection for providing a line of light in fixed position, and an objective lens in the neighborhood of the area of translation on the film but spaced therefrom for collecting said projected light and directing the same as a converged narrow line extending transversely of the direction of movement of the film and passing through the area of translation on the film and to said cell.

13. An apparatus for reproducing speech, music or the like sounds from vibrations recorded on a film, by the use of a line of light varied in accordance with the sound, comprising a photoelectric cell, means for imparting to the film a rapid and uniform motion longitudinally of the film past said cell, a source of light projection for providing said light, and an objective lens in the path of said light and spaced from the film for directing said light as a converging narrow line impinging on the film at a point in the region of the focal point of said lens, said light passing through the film and on to said cell, the space between said lens and the film being free of obstructions to said light.

14. In combination, optical means for translating sound or similar vibrations to or from a film record by the use of light varied in accordance with the sound, a constant speed film feeding mechanism, comprising a continuously rotating feeding roller, a fly wheel, a roller over which the film passes and which roller is operatively connected to said fly wheel, and means to compensate for variations in the motion of the film arising from small irregularities in the motion of the film as fed by said feeding roller.

15. In combination, optical means for translating sound or similar vibrations to or from a film record by the use of light varied in accordance with the sound, a constant speed film feeding mechanism, comprising a continuously rotating feeding roller, a fly wheel, a roller over which the film passes and which roller is operatively connected to said fly wheel, means to compensate for variations in the motion of the film arising from small irregularities in the motion of the film as fed by said feeding roller, said compensating means including a spring pressed roller engaging the film at a point between said feeding roller and said fly wheel roller with a resilient pressure causing the film to be deflected a variable amount in passing over said spring pressed roller, the extent of such deflection varying with said irregularities of motion.

16. In combination, optical means for translating sound or similar vibrations to or from a film record by the use of light varied in accordance with the sound, a constant speed film feeding mechanism, comprising a continuously rotating feeding roller, a fly wheel, a roller over which the film passes and which roller is operatively connected to said fly wheel, means to compensate for variations in the motion of the film arising from small irregularities in the motion of the film as fed by said feeding roller, said compensating means including a member yieldingly pressing against the film at a point between said feeding roller and said fly wheel roller to variably deflect the film from a straight line path at such point.

17. In phonographic apparatus in which the sound record is formed on an elongated carrier of inconsiderable mass, the combination of means for supporting and progressing the elongated carrier from one point to another point, and past an intermediate point at which the record is made on the carrier in recording or from which the record is taken from the carrier in reproducing, including a cylinder over a portion of the periphery of which the carrier passes adjacent to said intermediate point, a fly wheel operatively associated with said cylinder, said carrier progressing means operating to advance the carrier past said intermediate point at uniform speed under the control of said fly wheel.

18. The method of translating sound or similar vibrations to or from a film record by the use of light varied in accordance with the sound, comprising rapidly advancing the film past the point of translation, and subjecting the motion of the film in passing said point, to the control of inertia means to effectively eliminate irregularities in the movement of the film.

19. The method according to claim 18, and in which the film is yieldingly pressed into contact with a supporting area immediately adjacent the point of translation, such pressure cooperating with the inertia control in the elimination of irregularities in the film motion.

HANS VOGT.
JOSEPH MASSOLLE.
DR. JOSEF ENGL.

CERTIFICATE OF CORRECTION.

Patent No. 1,713,726.                                        Granted May 21, 1929, to

HANS VOGT ET AL.

It is hereby certified that error appears in the printed specification of the above numbered patent requiring correction as follows: Page 2, line 6, for the word "as" read "is"; line 9, for "or" read "on"; line 16, for "roller" read "sprocket", and line 28, for "with" read "the"; page 4, line 113, claim 8, for "position" read "portion"; and that the said Letters Patent should be read with these corrections therein that the same may conform to the record of the case in the Patent Office.

Signed and sealed this 2nd day of July, A. D. 1929.

(Seal)
M. J. Moore,
Acting Commissioner of Patents.

DISCLAIMER 1,713,726.—*Hans Vogt*, Berlin-Wilmersdorf, and *Joseph Massolle* and *Josef Engl*, Berlin-Grunewald, Germany. DEVICE FOR PHONOGRAPHS WITH LINEAR PHONOGRAM CARRIERS. Patent dated May 21, 1929. Disclaimer filed June 1, 1933, by the assignee, American Tri-Ergon Corporation, licensee, Tri-Ergon Holding, A. G., approving and ratifying same.

Hereby enters this disclaimer to such parts of the claims which it does not choose to claim or hold by virtue of the patent or said assignments, to wit:

(a) All combinations and methods set forth in the specification and claims of the patent, except as embodied respectively in apparatus wherein and methods whereby sound is translated by light to or from a film strip moving uniformly past said light.

(b) The method as set forth in claim 9, except wherein the uniformity of movement of the film past the translation point is effected by subjecting the portion of the film passing said point to the control of the inertia of a rotating weighty mass.

(c) The combination as set forth in claim 13, except wherein a flywheel is operatively connected with the film through means which imparts uniformity of motion of the flywheel to the film.

(d) The combination as set forth in claim 17, except wherein a sprocket engaging the carrier forms a part of the carrier progressing means and a substantial portion of the periphery of the cylinder is in contact with the carrier in its travel from the intermediate point to said sprocket.

(e) The method as set forth in claim 18, and said method as incorporated in claim 19, except wherein the inertia control is effected by passing the film over a rotating member and so applying inertia thereto as to eliminate substantially all irregularities in its rotation.

[*Official Gazette June 27, 1933.*]

subjecting the motion of the film in passing said point, to the control of inertia means to effectively eliminate irregularities in the movement of the film.

19. The method according to claim 18, and in which the film is yieldingly pressed into contact with a supporting area immediately adjacent the point of translation, such pressure cooperating with the inertia control in the elimination of irregularities in the film motion.

HANS VOGT.
JOSEPH MASSOLLE.
DR. JOSEF ENGL.

CERTIFICATE OF CORRECTION.

Patent No. 1,713,726.   Granted May 21, 1929, to

HANS VOGT ET AL.

It is hereby certified that error appears in the printed specification of the above numbered patent requiring correction as follows: Page 2, line 6, for the word "as" read "is"; line 9, for "or" read "on"; line 16, for "roller" read "sprocket", and line 28, for "with" read "the"; page 4, line 113, claim 8, for "position" read "portion"; and that the said Letters Patent should be read with these corrections therein that the same may conform to the record of the case in the Patent Office.

Signed and sealed this 2nd day of July, A. D. 1929.

(Seal)
M. J. Moore,
Acting Commissioner of Patents.

DISCLAIMER 1,713,726.—*Hans Vogt*, Berlin-Wilmersdorf, and *Joseph Massolle* and *Josef Engl*, Berlin-Grunewald, Germany. DEVICE FOR PHONOGRAPHS WITH LINEAR PHONOGRAM CARRIERS. Patent dated May 21, 1929. Disclaimer filed June 1, 1933, by the assignee, American Tri-Ergon Corporation, licensee, Tri-Ergon Holding, A. G., approving and ratifying same.

Hereby enters this disclaimer to such parts of the claims which it does not choose to claim or hold by virtue of the patent or said assignments, to wit:

(a) All combinations and methods set forth in the specification and claims of the patent, except as embodied respectively in apparatus wherein and methods whereby sound is translated by light to or from a film strip moving uniformly past said light.

(b) The method as set forth in claim 9, except wherein the uniformity of movement of the film past the translation point is effected by subjecting the portion of the film passing said point to the control of the inertia of a rotating weighty mass.

(c) The combination as set forth in claim 13, except wherein a flywheel is operatively connected with the film through means which imparts uniformity of motion of the flywheel to the film.

(d) The combination as set forth in claim 17, except wherein a sprocket engaging the carrier forms a part of the carrier progressing means and a substantial portion of the periphery of the cylinder is in contact with the carrier in its travel from the intermediate point to said sprocket.

(e) The method as set forth in claim 18, and said method as incorporated in claim 19, except wherein the inertia control is effected by passing the film over a rotating member and so applying inertia thereto as to eliminate substantially all irregularities in its rotation.

[*Official Gazette June 27, 1933.*]

DISCLAIMER 1,713,726.—*Hans Vogt*, Berlin-Wilmersdorf, and *Joseph Massolle* and *Josef Engl*, Berlin-Grunewald, Germany. DEVICE FOR PHONOGRAPHS WITH LINEAR PHONOGRAM CARRIERS. Patent dated May 21, 1929. Disclaimer filed June 1, 1933, by the assignee, *American Tri-Ergon Corporation*, licensee, *Tri-Ergon Holding, A. G.*, approving and ratifying same.

Hereby enters this disclaimer to such parts of the claims which it does not choose to claim or hold by virtue of the patent or said assignments, to wit:

(a) All combinations and methods set forth in the specification and claims of the patent, except as embodied respectively in apparatus wherein and methods whereby sound is translated by light to or from a film strip moving uniformly past said light.

(b) The method as set forth in claim 9, except wherein the uniformity of movement of the film past the translation point is effected by subjecting the portion of the film passing said point to the control of the inertia of a rotating weighty mass.

(c) The combination as set forth in claim 13, except wherein a flywheel is operatively connected with the film through means which imparts uniformity of motion of the flywheel to the film.

(d) The combination as set forth in claim 17, except wherein a sprocket engaging the carrier forms a part of the carrier progressing means and a substantial portion of the periphery of the cylinder is in contact with the carrier in its travel from the intermediate point to said sprocket.

(e) The method as set forth in claim 18, and said method as incorporated in claim 19, except wherein the inertia control is effected by passing the film over a rotating member and so applying inertia thereto as to eliminate substantially all irregularities in its rotation.

[*Official Gazette June 27, 1933.*]